United States Patent
Lorch

[15] 3,665,229
[45] May 23, 1972

[54] ROTARY CRYOGENIC MACHINERY

[72] Inventor: Hugh Olaf Lorch, Stafford, England
[73] Assignee: The English Electric Company Limited, London, England
[22] Filed: Mar. 31, 1971
[21] Appl. No.: 129,712

[30] Foreign Application Priority Data

Apr. 3, 1970 Great Britain.....................15,913/70

[52] U.S. Cl..................................................310/52, 310/86
[51] Int. Cl. ..............................................................H02k 9/00
[58] Field of Search.....................310/52, 40, 55, 53, 86, 58, 310/59, 53, 64, 65

[56] References Cited

UNITED STATES PATENTS

| | | | |
|---|---|---|---|
| 3,242,418 | 3/1966 | Mela | 310/40 |
| 3,289,019 | 11/1966 | Buchhold | 310/52 |
| 3,457,440 | 7/1969 | Horsley | 310/52 |
| 3,517,231 | 6/1970 | Massar | 310/52 |

Primary Examiner—William H. Beha, Jr.
Assistant Examiner—R. Skudy
Attorney—Misegades & Douglas, Keith Misegades and George R. Douglas, Jr.

[57] ABSTRACT

Cryogenic machinery in which coolant fluid is supplied to a rotor via a central path, and disposed radially outwards in an annular flow space into axially extending cooling paths in the periphery of the body. Fluid is exhausted from the cooling paths via annular flow spaces at each end of the body into outlet paths concentric with the inlet path, and the outlet paths and inlet path are vacuum insulated from one another.

12 Claims, 3 Drawing Figures

ROTARY CRYOGENIC MACHINERY

This invention relates to rotary cryogenic machinery. More particularly, the invention relates to a machine which includes a generally cylindrical rotating body in which the two ends of the body are each provided with a cooled heat shield for reducing heat entering the body, and the major part of the periphery of the body, between the heat shields, is cooled to a very low temperature.

The object of the invention is to provide a means of conveying very cold fluid from the center of a rotating body to the periphery and back again, to provide a cooled heat shield at each end to reduce heat leaking into the body, to provide thermal isolation between parts of the fluid at different temperatures, and to accommodate thermal contractions by the use of flexible disc members.

The invention is related to the synchronous dynamo-electric machine having a rotor with a superconducting direct current field winding as disclosed in my copending application Ser. No. 848,521 filed Aug. 8, 1969 but is not restricted to that particular use.

Figure 1A:
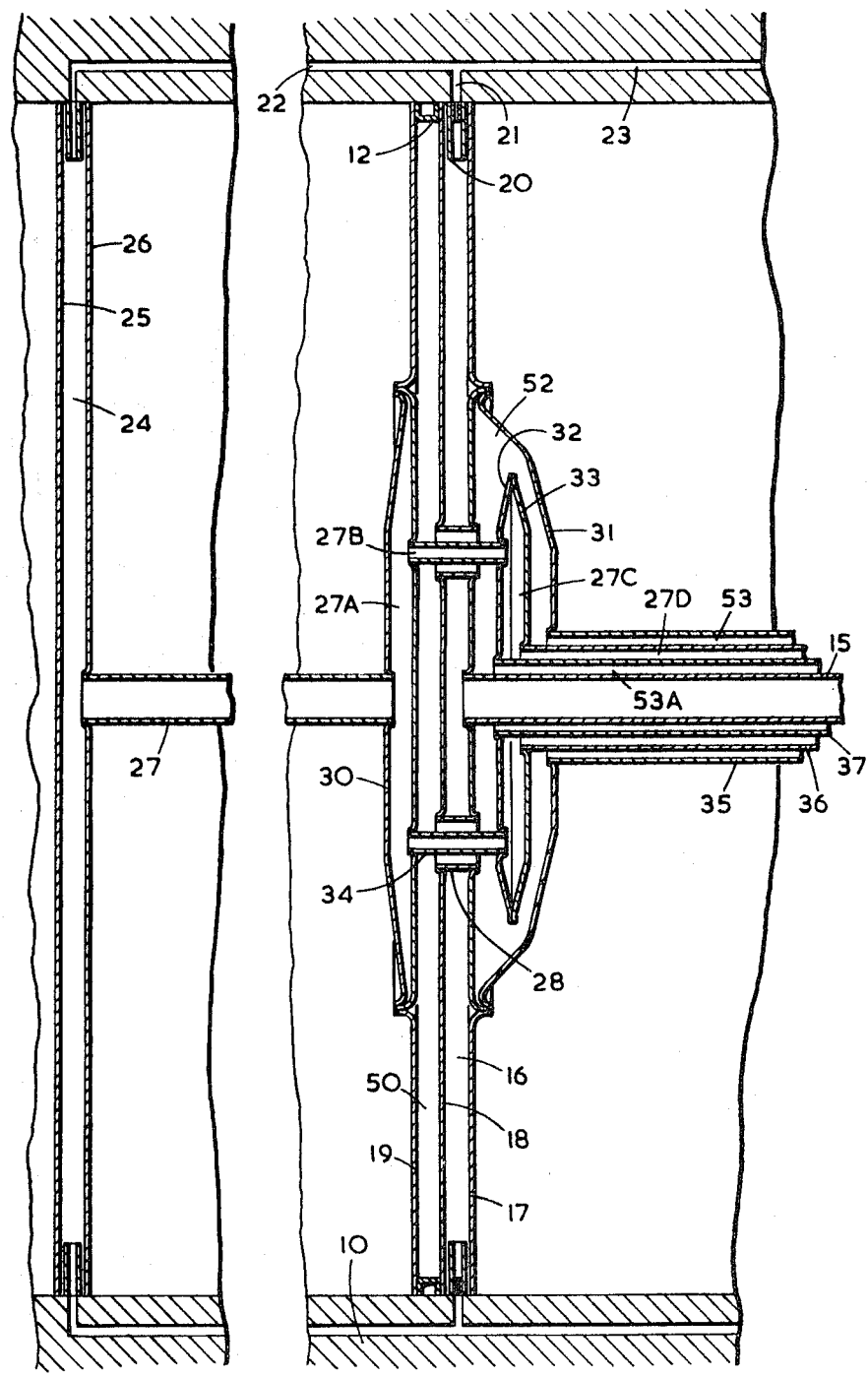
Figure 1B:
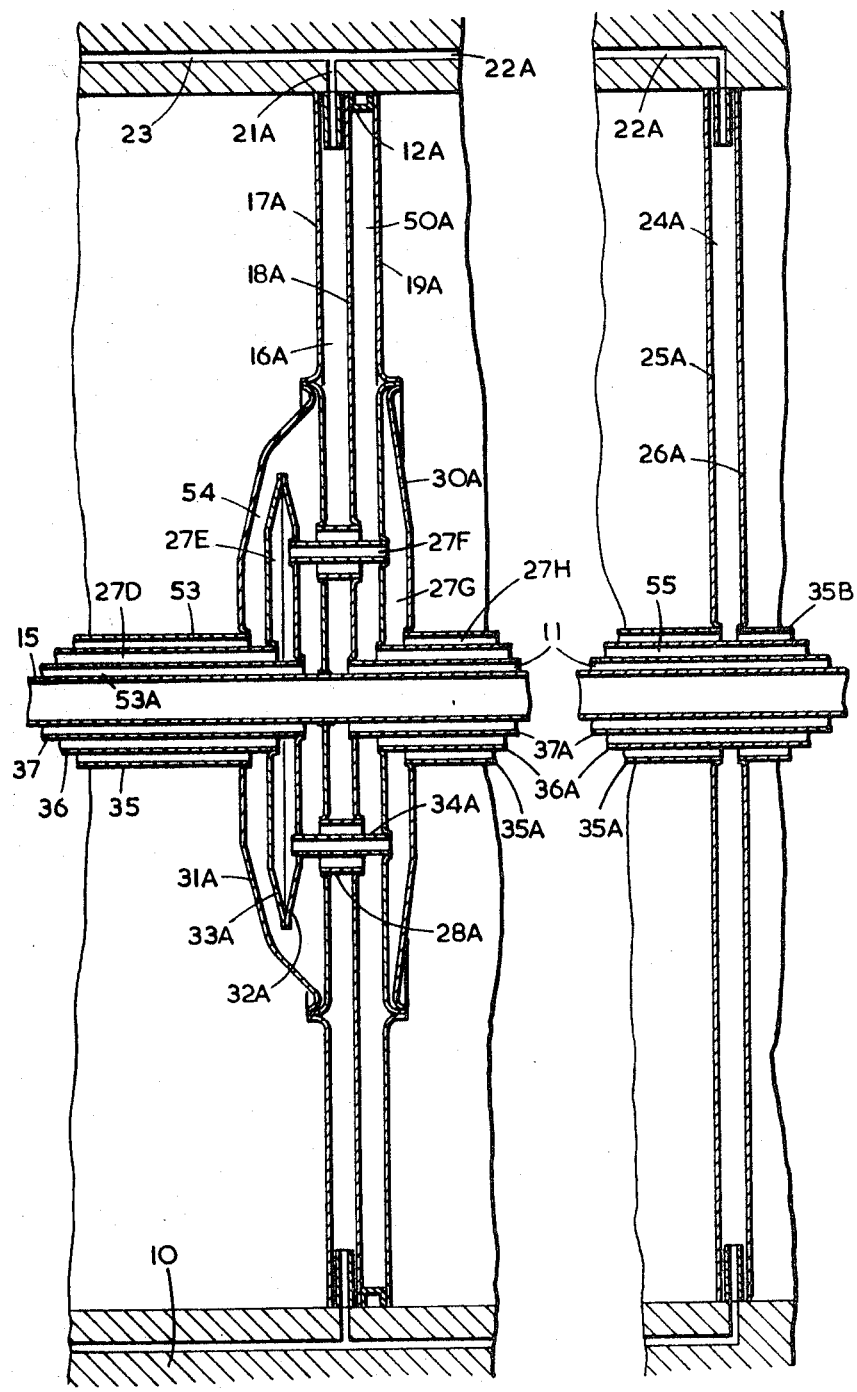
Figure 2:
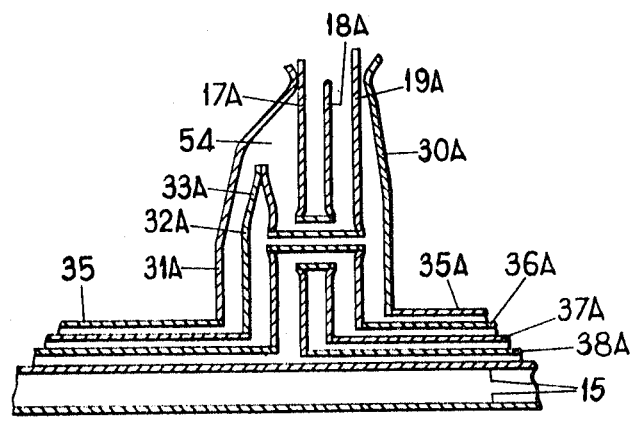

In order that the invention may be better understood, one embodiment thereof will now be described, by way of example, with reference to the accompanying diagrammatic drawings in which FIGS. 1A and 1B are sections through the two ends of a single rotating body and FIG. 2 shows a scrap view of an alternative to the arrangement shown in FIG. 1B.

In FIGS. 1A and 1B of the drawings the reference 10 indicates part of a body which is arranged for rotation and which hereinafter will be referred to as the rotor. The rotor is arranged to be cooled and is provided with heat shields which prevent excessive heat entering the rotor. The rotor can be of any suitable material, for example metal if the body is part of a centrifuge or part of apparatus used in a chemical process, or the body can be of a plastic material for the same uses or for use as part of electrical apparatus. All other parts of the embodiment of the machine to be described are of a corrosion-resistant material such as stainless steel.

FIGS. 1A and 1B show a tube 15 which is the inlet tube for supplying cold fluid to the body and like all other parts to be described this tube rotates with the body. The tube 15 extends towards the end of the body shown in FIG. 1A where it communicates with a first annular flow space 16. This flow space is provided between first and second plates 17 and 18 respectively which extend to the inner peripheral face of the rotor. A third plate 19 is disposed adjacent plates 18 and a metal ring 12 is sealed to the peripheries of these two discs to form a first vacuum insulation annular chamber 50 which is evacuated so that the outer face of the flow space 16 is thermally isolated by a vacuum. Since the flow space 16 rotates, it will pump the cold fluid to the periphery of the body 10 and since the pumping effect of the space 16 may be greater than desired restrictors 20 may be provided, as shown, to control the flow of fluid. From the restrictors, if used, the fluid flows into one or more ducts 21 in the rotor and then divides to flow in ducts 22 and 23 defining second and first sets of flow paths respectively provided within the periphery of the rotor. The ducts 22 and 23 are provided in restricted parts of the periphery as disclosed in the previously mentioned copending application Ser. No. 848,521.

Fluid flowing in the ducts 22 flows towards the end of the rotor absorbing most of the heat that would otherwise be conducted into the central regions of the rotor from the hotter parts near the end thereof. The fluid then flows into a second annular flow space 24 provided between fourth and fifth plates 25 and 26. The fluid flows to the center of the flow space 24 and then into a first outlet tube 27. The fluid in the flow space 24 is warmer than in the flow space 16, but cold enough to provide a thermal barrier which prevents much heat from entering the interior of the rotor. The fluid in the first outlet tube 27 is at a higher temperature than that flowing in the flow space 16 and it is therefore necessary to take the fluid from the first outlet tube 27 across the flow space 16 without causing heating of the fluid therein. This is achieved by providing a flow path through four dished discs 30 to 33 each having a central aperture.

The outer periphery of the disc 30 is secured with a fluid tight joint to the outer face of the plate 19 and the end of the tube 27 is secured in the central aperture of the dished disc 30 with a fluid tight joint. The space between the disc 30 and the plate 19 constitutes a first annular flow chamber designated 27A. The dished disc 31 is similarly secured to the outer face of plate 17 and to an axially extending first vacuum insulation tube 35 and the dished discs 32 and 33 are secured together at their outer peripheries and at their inner peripheries to an axially extending second outlet tube 36 and an axially extending vacuum insulation tube 37 disposed about the first inlet tube 15. The space enclosed by the dished discs 32 and 33 forms a second annular flow chamber designated 27C and the annular outlet passage between tubes 36 and 37 is designated 27D, and the space enclosed by the dished disc 31 forms a second annular vacuum insulation chamber designated 52.

Two short vacuum insulation tubes 28 extend across the flow space 16 and are sealed with vacuum tight joints to the two plates 17 and 18. Two further tubes 34 which are similarly secured to the plate 19 and dished disc 32 are disposed within the vacuum insulation tubes 28 and thus connect the first annular flow chamber 27A with the second annular flow chamber 27C by a path designated 27B by which fluid may be traversed across the flow space 16. As previously stated, the first vacuum insulation chamber 50 between plates 18 and 19 is evacuated and the second vacuum insulation chamber 52 enclosed by the dished disc 31, the insides of the vacuum insulation tubes 28 and the space 53 between the vacuum insulation tube 35 and the outlet tube 36, and space 53A between the inlet tube 15 and vacuum insulation tube 37 are also all evacuated.

Warm fluid flowing from the first outlet tube 27 is thus carried across the flow space 16 in the path 27A, 27B and 27C to the annular outlet passage 27D and the whole of this path is vacuum isolated from the fluid flowing along the tube 15 and the flow space 16.

The warm fluid in the second annular flow space 24 is warmer than and so less dense than that in first annular flow space 16 and so there is a net pressure tending to cause the fluid to flow from inlet to outlet.

The dished discs 30 to 33, being of dished shape, are flexible and thereby accommodate for thermal contraction caused by the cooling fluid, as to the plates 17, 18 and 19, although they are not dish shaped.

Two passages 27B are shown in FIG. 1A but more could be provided if necessary or only one such passage may be required. However, with only one such passage the rotor construction would have to be slightly modified to prevent unbalance.

Fluid flows axially along the ducts 23 towards the inlet-outlet end of the cooling arrangement to cool the periphery of the rotor. This cooling fluid could be evacuated radially inwards from the periphery of the rotor to an axial outlet path which could be a separate path or which could, for example, communicate with the passage 27D between the tubes 36 and 37.

However, the fluid reaching the right hand end of the ducts 23 as shown in FIG. 1B may only have risen very slightly in temperature as described in the previously mentioned copending application Ser. No. 848,521. In such a case the fluid can be returned in a thermal barrier or heat shield at the inlet-outlet end of the machine and the relatively low temperature of the fluid maintained in order to save refrigeration costs.

FIG. 1B shows an arrangement whereby this is achieved. The ducts 23 extending to the right hand end of the body communicate with one or more ducts 21A and with ducts 22A both of which are arranged in the same manner as the corresponding ducts 21 and 22 at the opposite end of the rotor. The duct 21A communicates with a third annular flow path 16A between sixth and seventh plates 17A and 18A respectively and an eighth, adjacent, plate 19A and metal ring 12A define a third vacuum insulation chamber 50A which, like the chamber 50 at the far end of the rotor, is evacuated. The plate 17A is secured to the inlet tube 15 and the disc 18A to an adjacent outlet tube 37A. The ducts 22A communicate with a fourth annular flow space 24A between two further plates 25A and 26A. The plate 25A connects with an outlet tube 35A and the plate 26A with an outlet tube 35B so that the flow space 24A communicates with an annular passage 27H between the tubes 35A and 35B and a tube 36A.

The annular passage between tubes 15 and 37A is designated 11 and constitutes a second outlet flow path for cooling fluid exhausting from the rotor. This passage 11 immediately surrounds the inlet tube 15 and is not isolated therefrom. As in the case of the previously mentioned copending application Ser. No. 848,521, it is necessary to pump the cooling fluid out through the passage 11. This reduces the temperature of the coolant flowing radially inwards in the third annular flow space 16A to below that of the coolant flowing into the rotor along the tube 15.

The coolant exhausting from the passage 11 will be heated by the coolant in the inlet tube 15 so that the inlet and outlet coolants are at substantially the same temperature.

In the previously mentioned copending application Ser. No. 848,521 the temperature and hence the pressure of the coolant flowing along the ducts 23 into the duct 21A is extremely critical and cannot be allowed to rise above a predetermined value. However, for other uses pumping out along the passage 11 may not be necessary, and the temperature of the outlet fluid in passage 11 may be appreciably higher than the inlet fluid in the inlet tube 15. In this case the outlet passage 11 could be thermally isolated from the inlet tube 15 by including an additional tube 38 between tubes 15 and 37A as shown in FIG. 2. With this arrangement the disc 17A is not sealed about the inlet tube 15 but has a longer central aperture to which is sealed one end of the additional tube 38. The other end (not shown) of the additional tube is sealed to the tube 15 so as to define a space about the tube 15. This space is evacuated and communicates with the fourth vacuum insulation chamber 54. The tubes 37A, 36A and 35A, and the plates 18A, 19A and the dished disc 30A are arranged as shown in FIG. 1B but the three tubes are of slightly longer diameter to accommodate the additional tube 38.

The relatively hot coolant in the passage 27D is taken across the third annular flow space 16A in a vacuum isolated path as follows. The passage 27D first connects with a third annular flow chamber 27E provided between a pair of dished discs 32A and 33A and the flow chamber 27E communicates with a fourth annular flow chamber 27G formed between the plate 19A and a fourth dished disc 30A. The passage 27F between the flow chambers 27E and 27G comprises one or more short outlet tubes 34A forming passages 27F, each surrounded by a vacuum insulation tube 28A which extends between the plates 17A and 18A. This passage 27F allows the fluid to traverse the third annular flow space 16A.

The second annular flow chamber 27G then communicates with an annular passage 27H between outlet tubes 35A and 36A, and the passage 27H continues beyond the point where it is joined to the fourth annular flow space 24A where the continuation of the tube 35A is designated 35B.

On the left hand side of the plate 17A there is provided a dished disc 31A, the periphery of which is sealed to the plate 17A. The dished disc 31A has a central aperture which is sealed to the end of the outlet tube 35. The disc 31A thus forms a fourth vacuum insulation chamber 54 about the third annular flow chamber 27E between the dished discs 32A and 33A. The vacuum insulation chamber 54 is evacuated and connects with the evacuated annular passage 53 between the tubes 35 and 36 and also with the evacuated third vacuum insulation chamber 50A. In turn this chamber 50A communicates with an evacuated annular passage 55 between tubes 36A and 37A and the annular passage 55 thus vacuum isolates the outlet passage 11 from the outlet passage 27H.

The discs 17A, 18A, 19A, 30A, 31A, 32A and 33A all accommodate thermal contraction by their flexibility.

I claim:

1. Cryogenic machinery having a generally cylindrical hollow rotor body which includes
    means defining an inlet flow path for coolant fluid, disposed along the axis of the body;
    means intermediate the ends of the body defining a first annular flow space connecting centrally with the inlet flow path;
    means defining first and second sets of coolant fluid flow paths connecting peripherally with the first annular flow space and extending axially towards one end of the body and the other end of the body respectively to conduct the fluid from the inlet flow path via the first annular flow space to the said one end and to the said other end of the body respectively;
    means defining a second annular flow space at the said other end of the body and connecting peripherally with the means defining the second set of flow paths at the said other end of the body;
    means defining a first axially extending coolant fluid outlet flow path one end of which is connected centrally with the means defining the second annular flow space to exhaust fluid from the second set of flow paths via the second annular flow space;
    the first outlet path including first traversing means for enabling the first outlet flow path to traverse the first annular flow space; and
    first vacuum insulating means defining an evacuated space interposed between the first outlet flow path and both the first annular flow space and inlet flow path.

2. Cryogenic machinery as claimed in claim 1, wherein the means defining the inlet flow path is an inlet tube;
    the means defining the first annular flow space comprises a first plate having a central aperture and a second plate spaced axially from the first plate, the plates being sealed to the inner surface of the cylindrical rotor body, and the end of the inlet tube being sealed to the first plate around the central aperture;
    the machinery further including a third plate spaced axially apart from and sealed to the second plate to define a first annular vacuum insulation chamber extending over the surface of the first annular flow space adjacent the said other end of the rotor body.

3. Cryogenic machinery as claimed in claim 2, wherein the means defining the second annular flow space comprises a fourth plate having a central aperture and a fifth plate spaced axially from the fourth plate, both plates being sealed to the said inner surface of the cylindrical rotor body;
    the means defining the first outlet flow path including;
    a first flexible dished disc having a central aperture and being sealed to the outer surface of the third plate to define a first annular flow chamber,
    a first outlet tube sealed at one end to the first flexible dished disc around the central aperture therein and at the other end to the fourth plate around the central aperture therein, thereby to connect the second annular flow space and the first annular flow chamber,
    second and third flexible dished discs centrally apertured and sealed together to define a second annular flow chamber spaced apart axially from the first annular flow space on the opposite side thereof to the first vacuum insulation chamber with the second flexible dished disc closer to the first annular flow space than the third flexible dished disc,
    a second outlet tube mounted concentrically around the inlet tube and sealed at one end around the central aperture in the third flexible dished disc;
    the first traversing means including at least one third outlet tube extending through aligned apertures in the first and second plates and sealed at one end around an aperture in the second flexible dished disc and at the other end around an aperture in the third plate, thereby to connect the first annular flow chamber with the second annular flow chamber.

4. A cryogenic machine as claimed in claim 3, wherein the first vacuum insulation means includes
 a fourth flexible dished disc sealed to the outer surface of the first plate to define a second vacuum insulation chamber around the second annular flow chamber,
 a first vacuum insulation tube arranged concentrically around the second outlet tube and sealed at one end around a central aperture in the fourth flexible dished disc,
 and a second vacuum insulation tube arranged concentrically around the third outlet tube and sealed at its ends around apertures in the said first and second plates respectively whereby to connect the first vacuum insulation chamber with the second vacuum insulation chamber,
the apparatus further including a third vacuum insulation tube mounted concentrically around the inlet tube between that tube and the second outlet tube and extending through the central aperture in the third dished disc and being sealed at one end around the central aperture in the second flexible dished disc to provide a vacuum insulation passage which extends between the inlet tube and the second outlet tube and communicates with the second vacuum insulation chamber.

5. A cryogenic machine as claimed in claim 4 including
means defining a third annular flow space which connects peripherally with the means defining the said first set of flow paths intermediate said first annular flow space and the said one end of the rotor body;
the first outlet flow path including second traversing means for enabling the first outlet flow path to traverse the third annular flow space;
means communicating with second traversing means for defining an extension of the first outlet flow path which extends from the second traversing means towards the said one end of the machine,
means defining a second outlet flow path disposed concentrically within the extension of the outlet flow path and connecting centrally with the third annular flow space to exhaust fluid from the first set of flow paths via the third annular flow space;
and second vacuum insulation means defining an evacuated space between the first and second outlet flow paths and between the second traversing means and the second outlet flow path.

6. A cryogenic machine as claimed in claim 5 wherein
the means defining the third annular flow space comprises sixth and seventh centrally apertured, axially spaced plates, the plates being sealed at their periphery to the said inner surface of the cylindrical body;
the first outlet flow path further includes centrally apertured fifth and sixth flexible dished discs sealed together to define a third annular flow chamber, the third vacuum insulation tube extending through the aperture in the flexible fifth dished disc, and being sealed around the aperture in the sixth flexible dished disc, and the second outlet tube being sealed around the aperture in the fifth flexible dished disc;
the machinery further including a centrally apertured eighth plate spaced axially apart from and sealed to the seventh plate to define a third vacuum insulation chamber extending over the surface of the third annular flow space adjacent the said one end of the body.

7. A cryogenic machine as claimed in claim 6 wherein
the means defining the second outlet flow path is a fourth outlet tube mounted concentrically around the inlet tube and being sealed at one end around the central aperture in the seventh plate;
the means defining the extension of the first outlet flow path including a centrally apertured seventh dished disc sealed to the outer surface of the eighth plate to define a fourth annular flow chamber, a fifth outlet tube mounted concentrically around the fourth outlet tube and sealed at one end around the aperture in the seventh flexible dished disc,
the second traversing means including at least one sixth outlet tube sealed at one end around an aperture in the sixth flexible dished disc and at the other end around an aperture in the eighth plate.

8. A cryogenic machine as claimed in claim 7 wherein the second vacuum insulation means includes
 a centrally apertured eighth dished disc sealed to the seventh plate so as to define a fourth vacuum insulation chamber around the third annular flow chamber, the first vacuum insulation tube being sealed around the central aperture to the eighth flexible dished disc to connect the first vacuum insulation chamber with the second vacuum insulation chamber;
 a fourth vacuum insulation tube mounted concentrically around each sixth outlet tube, and sealed at one end around an aperture in the sixth plate and at the other end around an aperture in the seventh plate; and
 a fifth vacuum insulation tube mounted concentrically with and between the fourth and fifth outlet tubes, and extending through the central aperture in the seventh flexible dished disc and being sealed at one end around the central aperture in the eighth plate.

9. A cryogenic machine as claimed in claim 8 including means defining a third outlet flow path including a fourth annular flow space connecting peripherally with the said first set of flow paths at the said one end of the body and centrally with the second outlet flow path thereby to exhaust fluid from the said first set of flow paths via the fourth annular flow space to the second outlet flow path.

10. A cryogenic machine as claimed in claim 9 wherein the means defining the fourth annular flow space includes centrally apertured, axially spaced, ninth and tenth plates sealed peripherally to the said inner surface of the cylindrical rotor body, the other end of the fifth outlet tube being sealed around the central aperture in the ninth plate;
and wherein the third outlet flow path further includes a sixth outlet tube disposed concentrically around the inlet tube, the fourth outlet tube and the fifth vacuum insulation tube respectively in axial alignment with the fifth outlet tube, one end of the sixth outlet tube being sealed around the central aperture in the tenth plate.

11. A cryogenic machine as claimed in claim 10 wherein the aperture in the sixth plate is sealed around the inlet tube.

12. A cryogenic machine as claimed in claim 10 wherein the second vacuum insulation means further includes
 a sixth vacuum insulation tube mounted concentrically between the inlet tube and the fourth outlet tube, and extending through the central aperture in the seventh plate, one end of the sixth vacuum insulation tube being sealed around the central aperture in the sixth plate and the other end being sealed to the inlet tube so as to define a vacuum insulation space, connecting with the fourth vacuum insulation chamber, between the inlet tube and the second outlet flow path.

* * * * *